United States Patent
Snijders

(10) Patent No.: US 7,212,191 B2
(45) Date of Patent: May 1, 2007

(54) OPERATING DEVICE FOR A COMPUTER

(75) Inventor: Christiaan Johannes Snijders, Wassenaar (NL)

(73) Assignee: Erasmus University Medical Center Rotterdam (Erasmus MC), Rotterdam (NL)

( * ) Notice: Subject to any disclaimer, the term of this patent is extended or adjusted under 35 U.S.C. 154(b) by 370 days.

(21) Appl. No.: 10/706,079

(22) Filed: Nov. 13, 2003

(65) Prior Publication Data

US 2004/0212591 A1 Oct. 28, 2004

(30) Foreign Application Priority Data

Jan. 8, 2003 (NL) .................................. 1022328

(51) Int. Cl.
G09G 5/08 (2006.01)
(52) U.S. Cl. ...................................... 345/163; 345/156
(58) Field of Classification Search ........ 345/156–167; D14/100, 114, 402, 408
See application file for complete search history.

(56) References Cited

U.S. PATENT DOCUMENTS 6,072,471 A * 6/2000 Lo .............................. 345/163
6,362,811 B1 * 3/2002 Edwards et al. ............ 345/163
6,532,002 B2 * 3/2003 Segalle ........................ 345/163
6,590,564 B1 * 7/2003 McLoone et al. ........... 345/167
6,954,198 B2 * 10/2005 Shih et al. ................... 345/163
2002/0084985 A1 7/2002 Hesley et al.

FOREIGN PATENT DOCUMENTS

DE 196 16 450 A1 10/1997
WO 00/51069 8/2000

* cited by examiner

Primary Examiner—Richard Hjerpe
Assistant Examiner—Duc Q Dinh
(74) Attorney, Agent, or Firm—Young & Thompson

(57) ABSTRACT

Operating device such as a mouse for operating a computer or the like. This device consists of a flat bearing surface on which a bulbous part has been arranged. This bulbous part consists of three (curved) surfaces, a surface for the palm of the hand for supporting the metacarpus/carpus, a central surface for supporting the proximal phalanges of the fingers and a distal surface for supporting the medial and distal phalanges. According to the present invention, the distal surface is made at an angle of approximately 75° with respect to the bearing surface. As a result of this angle there is optimum support for the fingers over the entire contour and it is possible to prevent RSI-like phenomena by preventing lifting movements of the fingers, which in the long term give rise to RSI-like phenomena.

8 Claims, 4 Drawing Sheets

OPERATING DEVICE FOR A COMPUTER

The present invention relates to an operating device for a computer or the like, comprising a support for a human hand provided with at least one button positioned such that it can be operated by the extremity of a finger, said device comprising a bearing surface and a bulbous part, shaped in accordance with the shape of the human hand, arranged thereon, said bulbous part comprising a proximal surface for supporting the mid section of the hand (metacarpus)/wrist section (carpus) of the operator, a central surface for supporting the proximal phalanges of the fingers and a distal surface for supporting the medial phalanges and distal phalanges.

Such an operating device, also referred to as a mouse, is generally known in the state of the art. One example is found in WO 99/16014. Many have tried to change the shape of a mouse in such a way that repetitive strain injury (RSI) no longer occurs. After all, it is assumed that RSI-like phenomena are caused by prolonged working with mice. In general, RSI-like phenomena are also referred to as WRMD (work-related musculo-skeletal disorders). Symptoms are reported mainly in the neck/shoulder region and in the elbow/wrist/hand region. Frequently these cannot be ascribed to mechanical/chemical or physical damage. That is to say, making a diagnosis without the patient's input is particularly difficult.

Nevertheless, RSI phenomena constitute a major problem and therefore many have attempted to produce mice and other operating devices with which the associated phenomena can be eliminated.

In PCT application PCT/NL00/00957 it is described that RSI-like phenomena are often caused by obstruction of the blood flow in the shoulder region. Such phenomena can be prevented to an appreciable extent by adopting a correct posture, which above all must not be cramped. The aim of the present invention is to provide an operating device for a computer with which RSI-like phenomena can be restricted or prevented.

According to one aspect of the invention, said aim is achieved with an operating device as described above in that the distal surface is at an angle of approximately 75° to said bearing surface.

The present invention is based on the insight that although existing operating devices provide support for wrist and metacarpus, they provide inadequate support for the medial phalanx and distal phalanx, respectively, of a finger.

Existing operating devices are constructed in such a way that a button becomes depressed when the relevant extremity of the finger is in the relaxed state. It is possible to make the button concerned so hard to move that depression does not take place, so that additional force is needed for the operation thereof, but in general this leads to an undesirable situation. This means that when the button is in the non-depressed position the relevant distal phalanx has to be lifted. According to the theory behind the present invention it is precisely this lifting movement of the extremities of the fingers that causes RSI-like phenomena in the long term. By, according to the present invention, making the distal surface steeper with respect to the horizontal surface (bearing surface), the rest position on the distal surface will approximately correspond to the non-flexed position of the muscles (flexors) that operate the relevant middle and distal phalanges. The flexors are flexed only when the button in this location is operated.

The present invention also provides a facility for limiting the stroke of action of the distal part of the fingers to a minimum.

The angle made by the various surfaces mentioned above must be understood to be the angle of the tangent that is drawn in the centre of the surface concerned. After all, the surfaces concerned can be curved. Moreover, it is not always clear where the transition between the various surfaces is located because there is a continually changing curvature of the bulbous part. Therefore, the various aspects are preferably related to various parts of the human hand. It will be understood that the operating device will be constructed depending on the size of that hand.

According to an advantageous embodiment of the invention, the angle between the central surface (surface formed by the proximal phalanges of the fingers) and the distal surface is approximately 45°. That is to say, the angle between the arm and the surface of the palm of the hand of the user is slightly bent (extension); approximately 165°. In this way a flexure of approximately 45° is produced in the joints between the proximal phalanges and the bones of the middle of the hand (articulatio metacarpo-phalangeale).

According to a further advantageous embodiment, the surface of the palm of the hand (mid-hand section/metacarpus) is at an angle of approximately 10° (angle φ) to the bearing surface (=support surface/desk or tabletop). That is to say, the angle between the lower arm and the metacarpus of the user is slightly bent (extension); approximately 165°.

According to an advantageous embodiment of the invention, the angle of the surfaces formed by the central surface and the surface for the palm of the hand is approximately 10° with respect to the bearing surface, rotated over the longitudinal axis (axis formed by hand and lower arm) in the direction of the little finger (supination).

According to an advantageous embodiment of the invention, the resulting angle of the little finger of the hand is approximately 20° with respect to the bearing surface.

Preferably, the bulbous part is provided with seats for both one or more fingers and the thumb. The seat for the thumb is preferably somewhat to the side alongside the bulbous part and is at an angle of approximately 40° with respect to the adjacent index finger. The button or buttons are preferably close to the free end of the distal surface. The various features are so made that the tip of the finger is a particularly short distance away from the support surface/desk or tabletop or the like on which the operating device is lying. This distance can be less than 1 mm. If two buttons are arranged alongside one another, the centre-to-centre distance thereof must be approximately 16–17 mm. A radius of curvature for the cavities will be chosen depending on the thickness of the finger or thumb concerned. This is again dependent on the size of the operating device.

The invention will be explained in more detail below with reference to an illustrative embodiment shown in the drawing. In the drawing:

FIG. 5 shows, diagrammatically, a side view of the operating device according to the present invention with the user's right hand drawn in;

Figure 1:
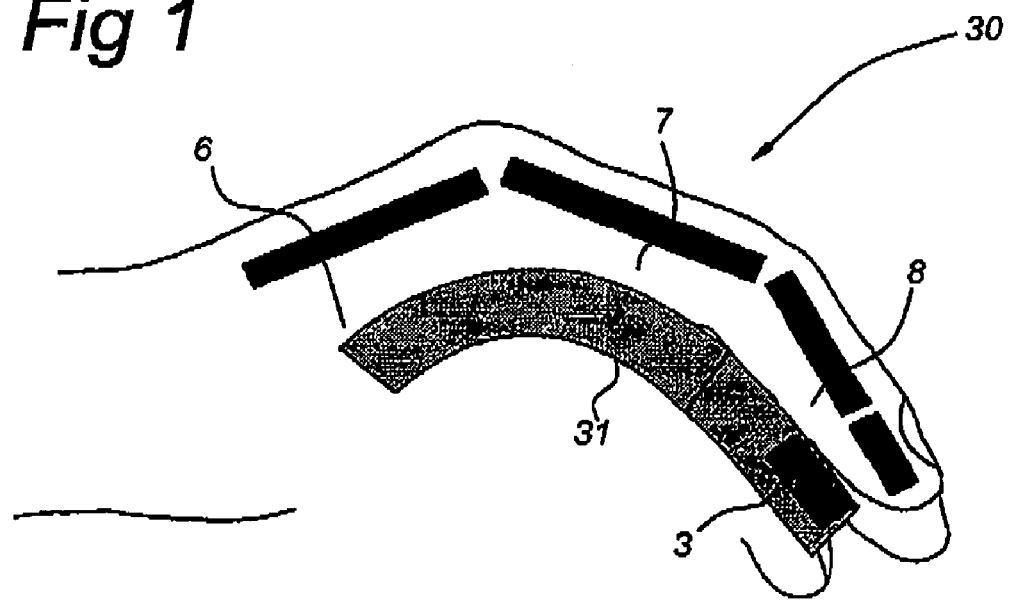
FIG. 1 shows a sketch of a side view of the rounded supported part of the human left hand.
Figure 2:
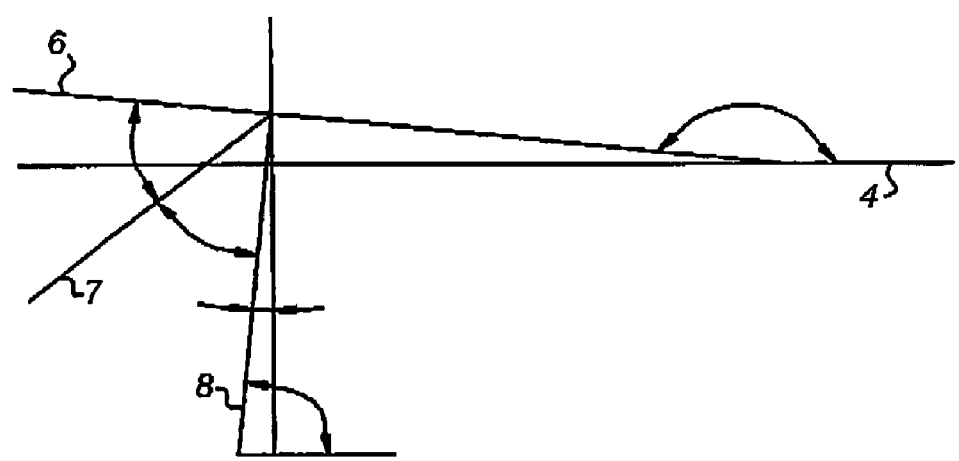
FIG. 2 shows a side view of the various angles that are of importance.
Figure 3:
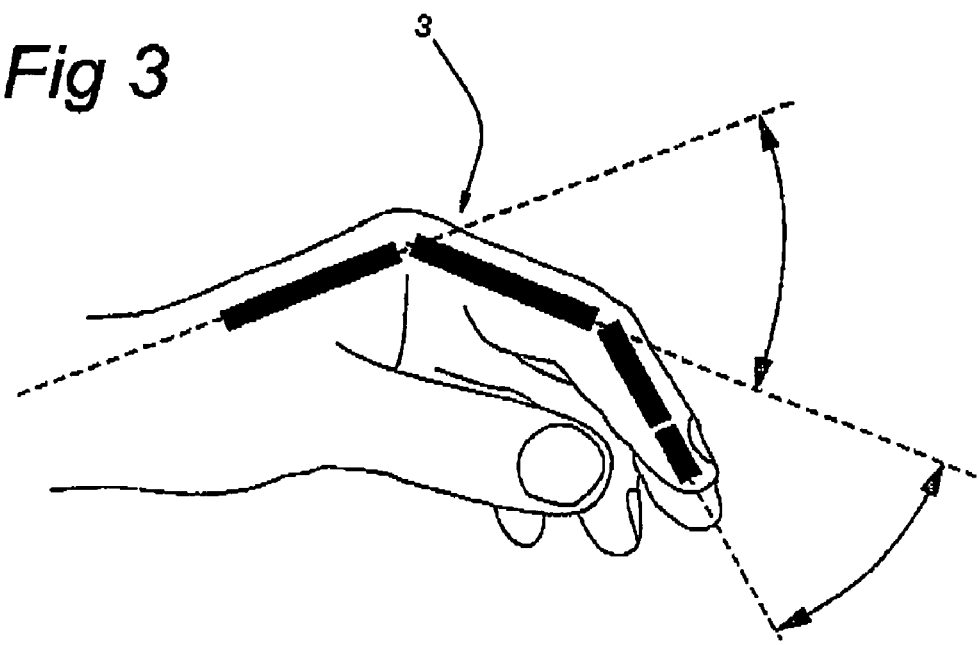
FIG. 3 shows a sketch of the side view of the rounded part of the human left hand in which the angular distribution with respect to the metacarpus and the proximal phalanx is indicated.

A side view of a supported part of the human left hand is shown diagrammatically in FIG. 1. This hand is indicated in its entirety by 30. The supported contour according to the invention is indicated by 31, whilst a button to be operated is indicated by 3. The supported contour can be differentiated into a proximal surface 6, a central surface 7 and a distal surface 8. The proximal surface supports the metacarpus and carpus, respectively. The central surface 7 supports the proximal phalanges. The distal surface supports medial and distal phalanges, respectively. In this figure the various features are shown in the most optimum supporting position. The various desired ranges for the angles are shown diagrammatically in FIGS. 2–4. The angle of the proximal surface, central surface and distal surface with respect to the support or desk or tabletop is shown in FIG. 2. These angles are also shown in FIG. 3. The most optimum position according to the invention is always shown and on the basis of FIG. 5 et seq. it is also shown how an operating device according to the present invention has been constructed from this. The operating device according to the present invention for a computer or the like is indicated in its entirety by 1 in FIGS. 5–9. This device is provided with a bearing surface 4 designed to bear on a flat table, desktop or the like. There is a curved or bulbous part 5 on the bearing part 4. This curved or bulbous part 5 consists of a surface 6 for the palm of the hand (proximal surface for supporting the metacarpus and the carpus), a central surface 7 and a distal surface 8. There are buttons 2 and 3 at the end of the distal surface. The surface 6 for the palm of the hand is designed to support lower arm 11 and, respectively, wrist joint 12 and the middle of the hand 14. The central surface is designed to support the proximal phalanges 15, whilst the distal surface 8 is designed to provide light support for the medial phalanges 16 and distal phalanges 17.

Figure 6:
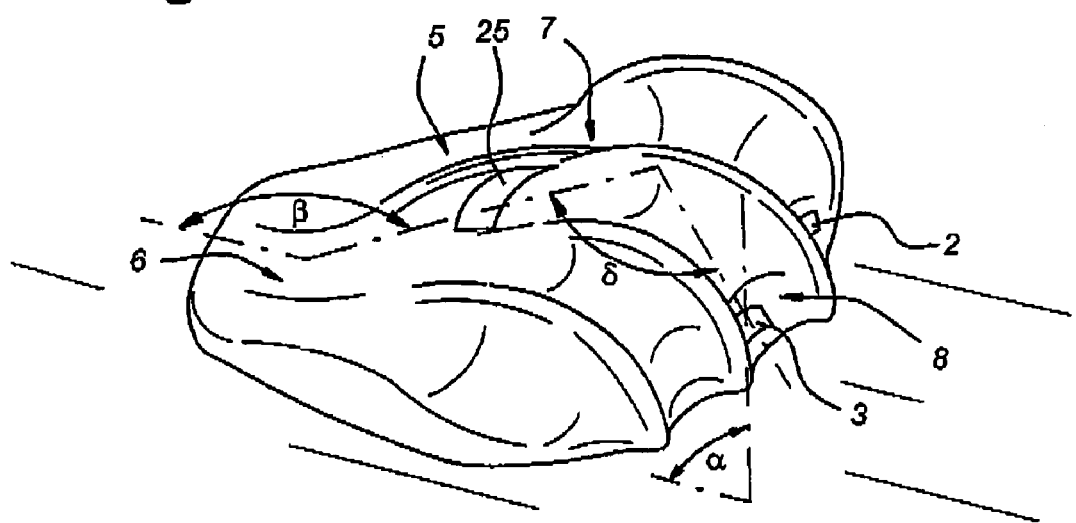
FIG. 6 shows the device according to FIG. 5 in which various relevant angles have been drawn.

It can be seen from FIGS. 2 and 6 that the angle $\alpha$ that the tangent at the mid section of the distal surface 8 makes with respect to the bearing surface 4 is approximately 75°. The angle $\alpha$ between the surface of the palm of the hand and the central surface is approximately 45°, the angle between the distal surface and the surface for the palm of the hand for supporting the metacarpus is 90°, whilst the angle $\beta$ is approximately 165°. Angle $\beta$ is of importance in order to provide adequate supination. That is to say, the lower arm and the hand must be turned sufficiently about the palm of the hand to be able to rest in the correct position on the support surface 25 indicated by broken lines. This support surface is at an angle $\phi$ of 5°–10° with respect to the bearing surface/desk or tabletop. By means of the rotation imposed in this way, full contact with the device is made and maintained and hunching of the shoulder can be prevented.

Figure 7:
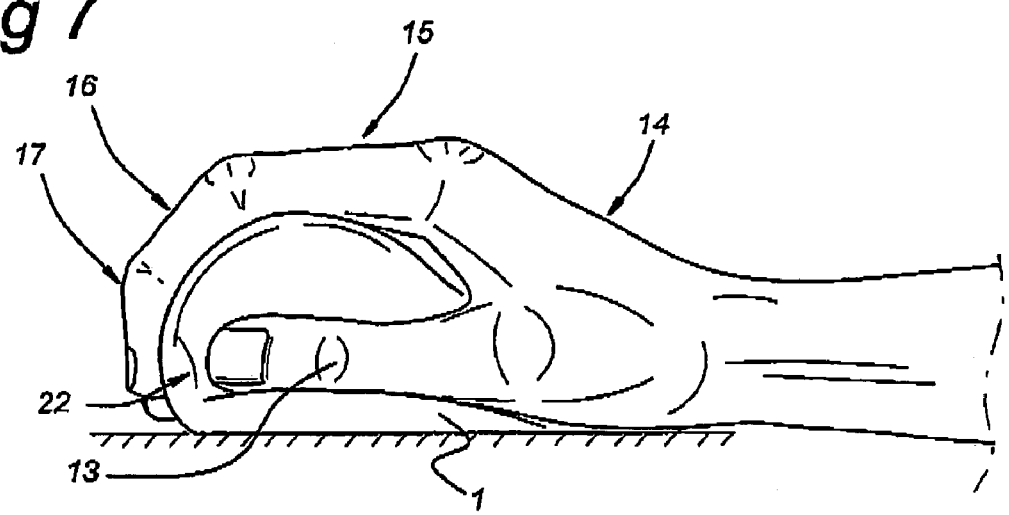
FIG. 7 shows a side view, from the thumb, of the device according to FIGS. 5 and 6.

The device according to the invention is shown in side view from the thumb side of the right arm and hand in FIG. 7. The thumb is indicated by 13 and this is accommodated in a cavity 22. The fingers are likewise accommodated in a cavity, as can be seen from FIGS. 8 and 9. The cavities for the fingers are indicated by 23 and 24 and open out at the buttons 2 and 3 (FIG. 9). The centre-to-centre distance between the buttons 2 and 3 is indicated by a and is preferably 16–17 mm. Cavity 22 has a radius of curvature r of approximately 55 mm. The buttons 2 and 3 are made with a corresponding curvature, which leads to a left/right "difference in height" over a button of 0.4–0.7 mm.

Figure 4:
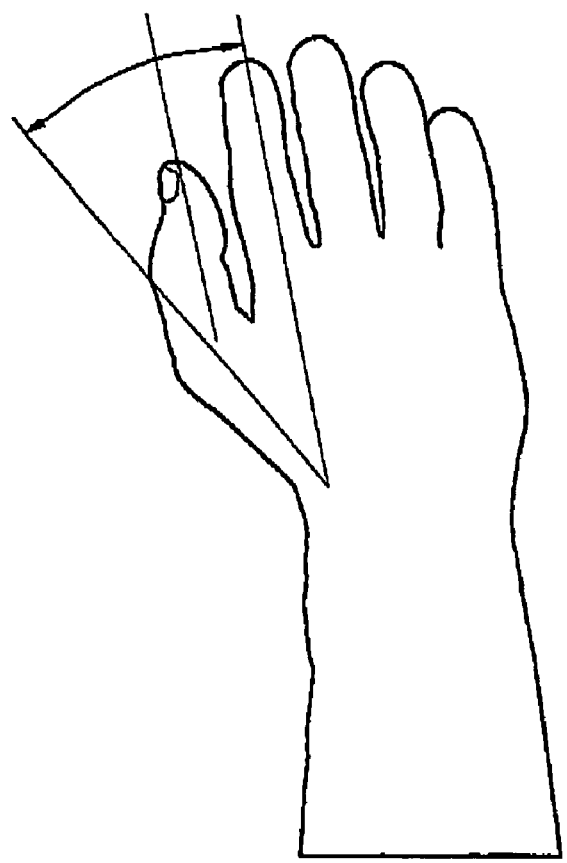
FIG. 4 shows a sketch of the position of the thumb with respect to the adjacent index finger.
Figure 5:
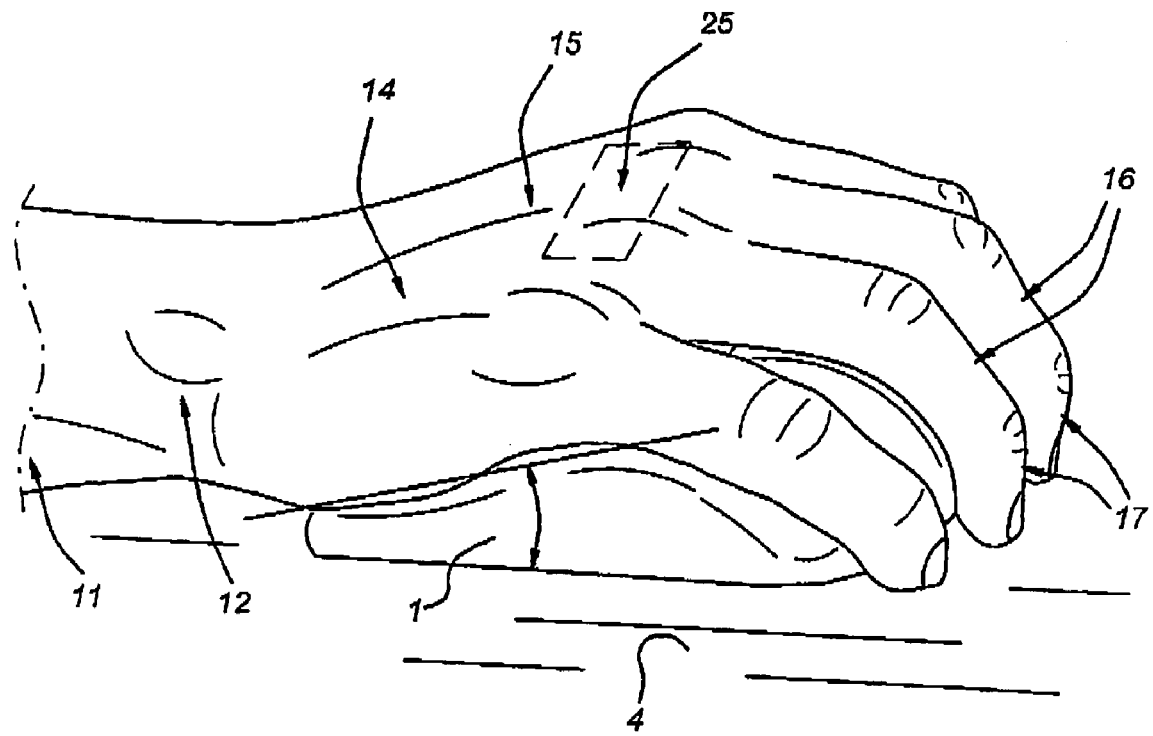
Figure 8:
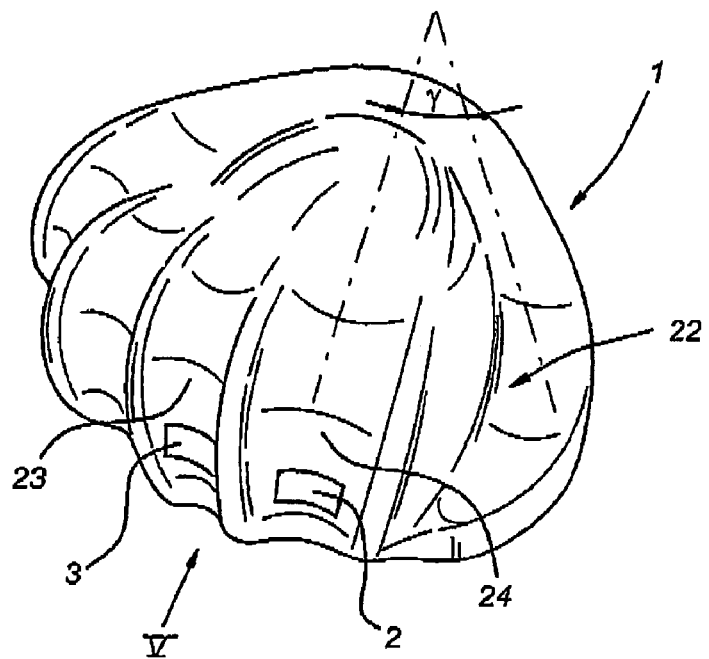
FIG. 8 shows a plan view of the device according to one of the previous figures.
Figure 9:
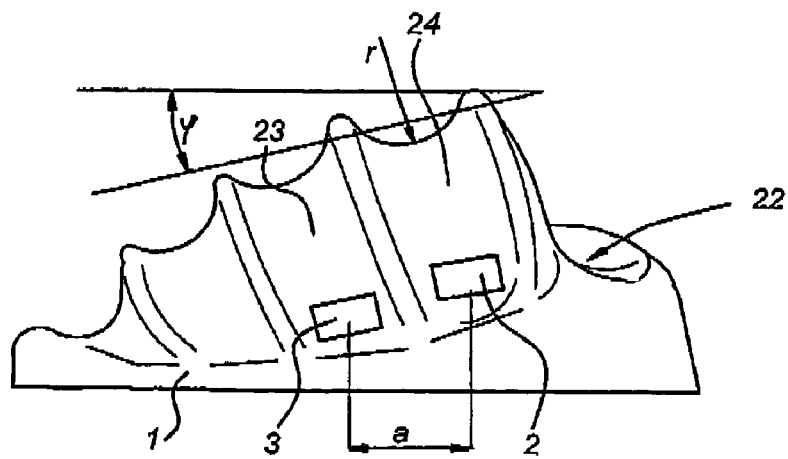
FIG. 9 shows a front view of the device according to the present invention.

The angle $\gamma$ which indicates the angle between the metacarpal of the thumb (metacarpal I) and the metacarpal of the index finger (metacarpal II) is shown in FIG. 4 and FIG. 8. This angle is approximately 40°. That is to say, the cavity 22 concerned is so made that the thumb assumes this optimum position with respect to the index finger.

The operating device described above is accurately tailored to the user's hand. Such tailoring can be obtained by starting from a basic model, several of which exist, and obtaining a shape corresponding to the hand and fingers, respectively, by "tailoring". This can be carried out, for example, by making use of a gel material. It will be understood that the device can be made for either the left or the right hand.

It has been found that with the dimensions mentioned above the hand can be relaxed in the optimum manner and RSI-like phenomena are no longer detected or are restricted. Moreover, by means of the present invention it is possible to detect and monitor the correct position of the hand by incorporating sensors. For this purpose pressure sensors, by means of which it can be detected whether the hand is in the correct position and that too high a squeezing/compressive force is not being applied, can be present in various positions in the device. Optionally, a signal can be emitted on the basis of which the user can make corrections immediately or in the course of time.

It will be understood that numerous modifications are possible, in particular depending on the size of the user's hand. This applies in particular in respect of the lengths given here. The values for the angles will in general remain unchanged and it must be understood that the values for the angles given here hold good for an average western hand.

It will be understood from the above that numerous variants of the invention are possible which are obvious after reading the above description and fall within the scope of the appended claims.

What is claimed is:

1. An operating device for a computer or the like, comprising a support for a human hand provided with at least one button positioned such that it can be operated by the extremity of a finger, said device comprising a bearing surface having a longitudinal axis and a bulbous part, shaped in accordance with the shape of the human hand, arranged thereon, said bulbous part comprising a surface for the palm of the hand for supporting the mid section of the hand (metacarpus)/wrist section (carpus) of the operator, a central surface for supporting the proximal phalanges of the fingers and a distal surface for supporting the medial phalanges and distal phalanges, wherein a tangent at said distal surface in a plane perpendicular to said bearing face, said plane including said longitudinal axis, is at an angle ($\alpha$) of approximately 75° with said bearing surface.

2. The device as claimed in claim 1, wherein the angle ($\delta$) between the central surface and the distal surface is approximately 45°.

3. The device as claimed in claim 1, wherein said surface for the palm of the hand is at an angle of approximately 15° to said support.

4. The device as claimed in claim 1, wherein the central surface and surface for the palm of the hand laterally are at an angle $\phi$ of approximately 10° with respect to the bearing surface, rotated over the longitudinal axis (axis formed by hand and lower arm) in the direction of the little finger, supination, with, as a result, maximum relaxation of hand, lower arm, neck and shoulders.

5. The device as claimed in claim 1, wherein there is a seat for the thumb made close to the end limit of said bulbous part.

6. The device as claimed in claim 5, wherein said seat extends at an angle $\gamma$ of approximately 40° with respect to the adjacent part.

7. The device as claimed in claim 1, wherein, close to said button, said distal surface is made with a cavity corresponding to the shape of the finger, with a radius of curvature (r) of less than 60 mm.

8. The device as claimed in claim 1, comprising two buttons that can be operated by two adjacent fingers, the centre-to-centre distance (a) of said buttons being 16–17 mm.

* * * * *